United States Patent
Behren

(10) Patent No.: US 7,363,514 B1
(45) Date of Patent: Apr. 22, 2008

(54) STORAGE AREA NETWORK(SAN) BOOTING METHOD

(75) Inventor: Paul von Behren, Boulder, CO (US)

(73) Assignee: Sun Microsystems, Inc., Santa Clara, CA (US)

( * ) Notice: Subject to any disclaimer, the term of this patent is extended or adjusted under 35 U.S.C. 154(b) by 303 days.

(21) Appl. No.: 11/049,121

(22) Filed: Feb. 1, 2005

(51) Int. Cl.
G06F 9/00 (2006.01)
G06F 9/24 (2006.01)
G06F 1/24 (2006.01)
G06F 15/177 (2006.01)

(52) U.S. Cl. ...................................... 713/200; 713/100
(58) Field of Classification Search ............... 713/2, 713/200, 100
See application file for complete search history.

(56) References Cited

U.S. PATENT DOCUMENTS

| | | | |
|---|---|---|---|
| 5,872,968 A * | 2/1999 | Knox et al. ................. 713/2 |
| 6,170,008 B1 * | 1/2001 | Bahlmann et al. .......... 709/220 |
| 6,490,677 B1 * | 12/2002 | Aguilar et al. .............. 713/1 |
| 6,742,025 B2 * | 5/2004 | Jennery et al. ............. 709/220 |
| 6,748,525 B1 | 6/2004 | Hubacher et al. |
| 6,857,069 B1 | 2/2005 | Rissmeyer et al. |
| 7,103,762 B2 * | 9/2006 | Harper et al. ............... 713/1 |
| 7,127,597 B2 * | 10/2006 | Backman et al. ............ 713/1 |
| 7,127,602 B1 * | 10/2006 | Bakke et al. ................ 713/2 |
| 2003/0126242 A1 | 7/2003 | Chang |
| 2003/0210522 A1 | 11/2003 | Rietze et al. |
| 2004/0034763 A1 * | 2/2004 | McCardle .................... 713/1 |
| 2004/0111559 A1 | 6/2004 | Heil |
| 2004/0243796 A1 | 12/2004 | Keohane et al. |
| 2005/0283606 A1 * | 12/2005 | Williams ...................... 713/166 |
| 2006/0047946 A1 * | 3/2006 | Keith, Jr. ...................... 713/2 |

OTHER PUBLICATIONS

Sarkar, Prasenjit, Missimer, Duncan, Sapuntzakis, Constantin, Bootstrapping Clients using the ISCSI Protocol, IP Storage Working Group, IBM, Brocade, Stanford University, http://www.ietf.org/internet-drafts/draft-ietf-ips-iscsi-boot-12.txt, Mar. 18, 2004, pp. 1-12.

* cited by examiner

Primary Examiner—Thomas Lee
Assistant Examiner—Michael Wang
(74) Attorney, Agent, or Firm—Michael C. Martensen; Kent A. Lembke; Hogan & Hartson LLP

(57) ABSTRACT

A method for performing a boot from a storage network. A first server stores boot configuration information linked to or searchable by a network device identifier. A second server stores intermediate boot modules configured to perform input/output (I/O) functions in the storage network. At the first server, a request from a network device is received that includes a hardware identifier for the network device. The first server uses the hardware identifier to retrieve boot configuration information for the network device that is transferred to the network device and that includes a location in the storage network of a disk device containing an operating system image and the second server address. The network device obtains the boot modules from the second server and runs them using the disk device location to read the operating system image from the disk device using storage I/O functions in the boot modules.

20 Claims, 4 Drawing Sheets

STORAGE AREA NETWORK(SAN) BOOTING METHOD

BACKGROUND OF THE INVENTION

1. Field of the Invention

The present invention relates, in general, to processes of starting up a computer or to the boot or bootstrap process for computing devices and servers in a network, and, more particularly, to a boot method, and systems configured to support using such a boot method, for use in loading an operating system (OS) on a networked computing device, such as a server, and starting up operation of the networked computing device with the loaded OS. The invention is particularly well suited for booting up servers from disk devices in a network, such as a storage area network (SAN).

2. Relevant Background

The typical start up or "boot" of a computer or computing device involves reading an operating system (OS) from disk. For example, when an OS is installed on a local disk in the computer, install software and/or boot support applications running on the computer discovers one disk or a few local disks and prompts the user to select a disk for use in the installation. At boot time, the boot applications, such as BIOS for X86-based systems and pre-boot applications for other computing devices including network servers and other devices, provide hardware assistance in performing the booting process, and this assistance has been extended for external (or non-local disks) with hardware components including controller cards. However, local disk boot support applications are only useful for working with a small number of disks, and it is becoming more and more common for computer devices including servers to be booted from an external disk that is chosen from numerous disks, such as hundreds or more disk devices, provided in a storage network, e.g., a storage area network (SAN).

A significant portion of properly starting up a computer is reading the OS from memory or disk, and this function can only be performed if the disk to be read from (or containing the OS) is adequately addressed to allow the computer that is starting up to locate the disk and the OS. At boot time, however, computers and their pre-boot applications or environment have very limited addressing capabilities. With a few local disks, a user may be asked to select a disk from a relatively short list of discovered disks. This solution is not useful for SAN implementations because it is not practical to discover all the available disks (e.g., not only disks in network but those not in use due to sharing and the like) in a the SAN and provide the user with the entire list. The discovery process is too time consuming, the information in the list is often not useful (e.g., not clear which disk device is which based on identifiers), and the list is simply too large to be processed readily by a user or system administrator.

A common boot method used with SANs involves utilizing another already booted up computer or system to identify an available disk. For example, prior to installing an OS to a disk in a SAN, an administrator may select a disk using some other storage network topology viewing software, such as a network navigation application. Then, during the OS installation procedure, the administrator is required to specify precisely a path from the booting computer or system to the selected disk. This path typically includes the disk's hardware name, which is similar in form to a serial number, the name of the controller on the host, and other information needed to inform the installation or pre-boot application or environment how to access the selected disk. The specification process is a manual process which is prone to data entry errors and is also a time-consuming, tedious process for the administrator that requires long strings of addresses and/or identifiers to be typed in precisely.

Another problem facing network administrators is the demand that multiple systems, such as servers and more particularly, blade servers, have the same OS installed. For example, it is now common for multiple blade servers to share a service processor that provides a common management environment for many servers including the OS installation tasks. However, prior to OS installation, there is generally no capabilities for program-to-program communications, and this lack of software component communication requires the manual entry of disk path data to facilitate OS installation during boot operations. Another difficulty with performing network or SAN booting with blade and other computing devices is that many pre-boot extensions require hardware in the form of controller cards to be added to provide the desired functions, but many of these devices are configured such that additional hardware cannot be readily added or inserted.

Hence, there remains a need for a boot method that better supports installation of an OS from an external disk, such as a disk or disk device in a SAN. Preferably such a method would address the problems with identifying an available disk among a large number of available disks and lessen or even remove the need for prior selection of a disk to read the OS from and for manual entry of address and/or identification information for such an OS source disk.

SUMMARY OF THE INVENTION

The present invention addresses the above and other problems by providing a method and corresponding systems for enabling a system, such as a server, to perform a boot using an image of an operating system on a disk device which is one of many such devices in a storage network, such as a storage area network (SAN). In one embodiment, a computer-based method is provided for performing a boot from a storage network. The method includes providing on a communications network, such as the Internet, a first server that stores sets of boot configuration information which are each linked to or searchable by a network device identifier. The method also includes providing a second server on the communications network that stores an intermediate boot module that is configured to perform input/output (I/O) functions in the storage network (such as based on transport protocols of the network such as iSCSI or Fibre Channel protocols). At the first server, a request from a network device is received that includes a hardware identifier, such as a Medium Access Control (MAC) address for a network adapter of the network device. The first server uses the hardware identifier to retrieve a set of boot configuration information for the network device, and this information is transferred to the network device.

The boot configuration information includes an address for the second server. The method continues with the network device contacting the second server to obtain the intermediate boot modules and then, running the boot modules to read the operating system image from the disk device using storage I/O functions provided by the boot modules. The location for a disk device in the storage network that contains an image of an operating system is included as part of the configuration from the first server or with the intermediate boot modules. A boot operation is then performed at the storage device using the read image of the operating system.

According to another aspect of the invention, a storage network boot system is provided that includes a configuration information service. The service is linked to a communications network and stores boot configuration information that is linked to a plurality of network card identifiers. A storage network is included in the system with a number of disk devices and one of these disk devices contains an operating system image. The boot system further includes a booting computer system that is linked both to the communications system and to the storage network. The booting computer system includes a network boot mechanism that operates to transmit a request (such as a DHCP request) over the communications network to the configuration information service, and the request includes a hardware address for the booting computer system (such as a MAC address for a network adapter). The configuration information service is adapted to respond to the request by returning the boot configuration information retrieved by matching the hardware address with one of the stored network card identifiers. The booting computer system processes the returned boot configuration information and uses a location provided in the information for the disk device containing the operating system image to read the image and then, boot with the read image.

Typically, a boot support service is also linked to the communications network, and the boot support service stores intermediate boot modules configured to provide I/O functionality in the storage network. The returned boot configuration includes a network address for the boot support service, and during operation, the booting computer system processes the returned boot configuration information and contacts the boot support service using the network address to download and run the intermediate boot modules. The intermediate boot modules use the location of the disk device to read the operating system image over the storage network and to store the read operating system image on the booting computer system. Generally, the I/O functionality of the intermediate boot modules comprise transport mechanisms complying with transport protocols of the storage network.

DETAILED DESCRIPTION OF THE PREFERRED EMBODIMENTS

In brief, the present invention is directed to a boot method for use in adding new or additional computing devices, such as servers or the like, to a distribute computer system or network. The boot method involves reading an operating system (OS) from a disk or disk device in a storage network (e.g., a storage area network (SAN)), and significantly, involves providing intermediate boot modules on the new or booting device that provide intelligence beyond the hardware and/or firmware input/output (I/O) capabilities available with typical pre-boot firmware or pre-boot environments. The intermediate boot modules and other components provided in the network according to the invention enable the new or booting device to address a storage network disk storing an OS image and to read the OS from that disk using storage network transport mechanisms (such as transport mechanisms provided according to iSCSI protocols, Fibre Channel protocols, or the like).

In the following discussion, computer and network devices, such as the software and hardware devices within the network systems 100, 300, are described in relation to their function rather than as being limited to particular electronic devices and computer architectures and programming languages. To practice the invention, the computer and network devices may be any devices useful for providing the described functions, including well-known data processing and communication devices and systems, such as application, database, web, blade, and entry level servers, midframe, midrange, and high-end servers, personal computers and computing devices including mobile computing and electronic devices with processing, memory, and input/output components and running code or programs in any useful programming language, and server devices configured to maintain and then transmit digital data over a wired or wireless communications network.

Figure 3:
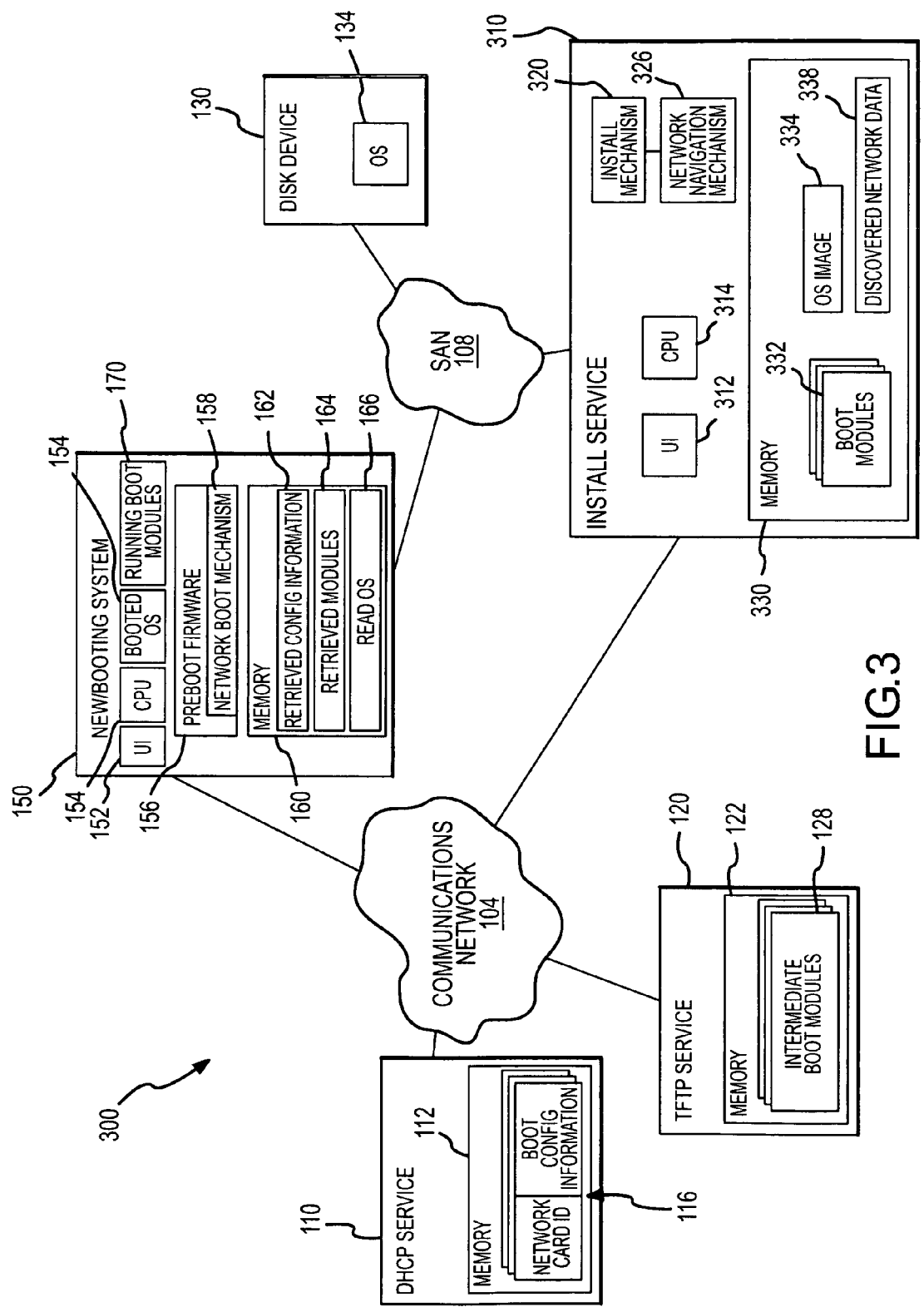
FIG. 3 illustrates another network similar to that of FIG. 1 but including components for performing operating system (OS) installation processes useful for placing a network or computer system in condition of performing boot methods according to the present invention.

Data storage systems and memory components, such as disk device 130, are described herein generally and are intended to refer to nearly any device and media useful for storing digital data such as disk-based devices, their controllers or control systems, and any associated software. Data, including transmissions to and from the elements of the network systems 100, 300 and among other components of the network/systems 100, 300 typically is communicated in digital format following standard communication and transfer protocols, such as TCP/IP, HTTP, HTTPS, FTP, and the like, or IP or non-IP wireless communication protocols. The invention is well-suited for use with disk devices in a storage network, such as a SAN, but other network arrangements may be used to practice the invention, and the storage network 108 of FIGS. 1 and 3 is typically an iSCSI SAN or Fibre Channel SAN but other existing and yet-to-be developed communication and transport protocols may be used to practice the invention.

Figure 1:
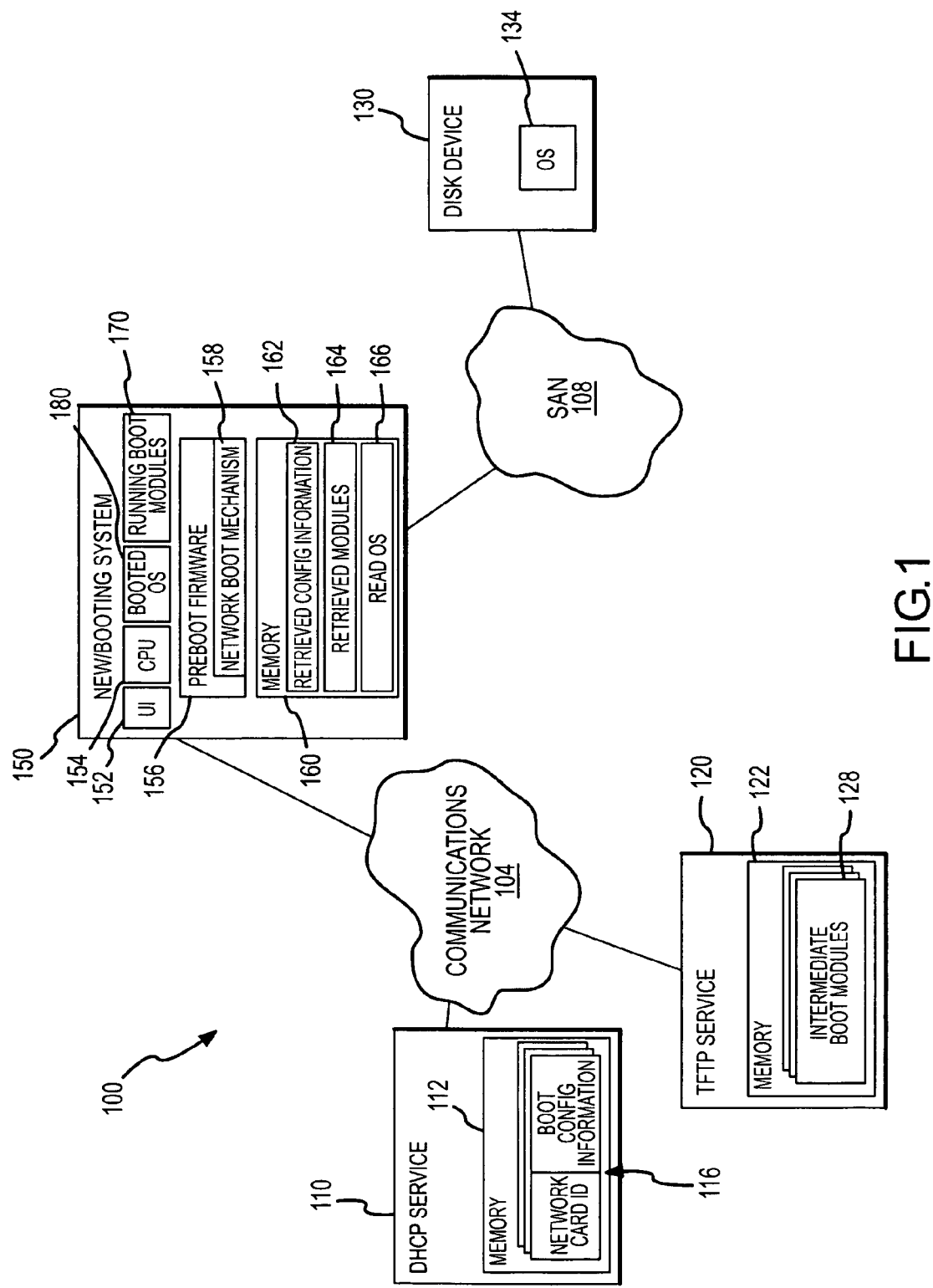
FIG. 1 illustrates a simplified computer network adapted for implementing a network boot according to the present invention.

FIG. 1 illustrates a simplified network system 100 that is adapted according to one embodiment of the invention for carrying out a storage network boot (or SAN boot). As shown, the network system 100 includes a communications network 104, such as the Internet, a LAN, a WAN, or the like and a storage network, such as a SAN, 108 used to communicatively link a plurality of disk devices 130 (with only one being shown for simplicity of explaining the features of the invention but not as a limitation). The SAN 108 may operate according to a variety of protocols including, but not limited to, Fibre Channel, SCSI, iSCSI, iFCP, FCIP, and the like. The disk device 130 may be nearly any disk device including a disk in an array including a virtual disk in a RAID array or other array.

To facilitate the SAN boot process, the network system 100 is preferably configured to include a number of communication links and to include a number of components. With this in mind, the disk device 130 is shown storing an image of an OS 134, which is to be used for booting new or booting servers or computing devices/systems, such as new system 150. Additionally, the network system 100 is shown to include a DHCP service 110 and a TFTP service 120 that are linked to the communications network 104, which may be provided on a single server or computer device or separately as shown. The DHCP service 110 is a service for enabling the new system 150 to obtain an IP address. As shown, the service 110 is configured according to the Dynamic Host Configuration Protocol (DHCP), e.g., a TCP/IP protocol that enables a server or device linked to the network 104 to obtain an IP address, and is shown to include memory 112 storing boot configuration information 116 for new systems, such as system 150, in the form of a network address or card ID linked to a set of boot configuration information. The use and content of the configuration information 116 is described below with reference to FIG. 2. The service 120 is provided to enable the new system 150 to download the added intelligence required to perform the SAN boot of the invention, and to this end, the service 120 is shown to include memory 122 storing sets of intermediate boot modules 128. The service 120 may be a TFTP service as shown that is configured according to the Trivial File Transfer Protocol to facilitate file transfer (but, as with the service 110, other file transfer protocols may be implemented including FTP).

In addition to these preconditions of the network system 100, the new or booting system 150 may include some components and/or capabilities to perform the SAN boot of the invention. As shown, the new system 150 includes a user interface 152 allowing a user or administrator to enter data, such as making a boot selection. A processor 154 is provided for running an operating system and user applications as well as managing operation of the system 150 and memory. The system 150 includes pre-boot firmware or a pre-boot environment 156 that is shown to at least include a network boot mechanism 158 that can be selected to be run via the user interface 152 and functions at boot time to initiate communications with the DHCP service 110 to obtain boot configuration information 116 associated with the identifier of the system 150. As precondition, the system 150 further includes memory 160 for storing retrieved data.

During the SAN boot method, the new system 150 operates to retrieve and store configuration information 162 from the DHCP service 110 and to retrieve intermediate boot modules 128 from the TFTP service 120 that are stored as modules 164. The modules 170 are run by the processor 154 of the system 150 and act to assist in reading the OS 134 from the disk device 130 for storage at 166 in memory 160. The read OS 166 can then be booted as shown by booted or running OS 180.

Figure 2:
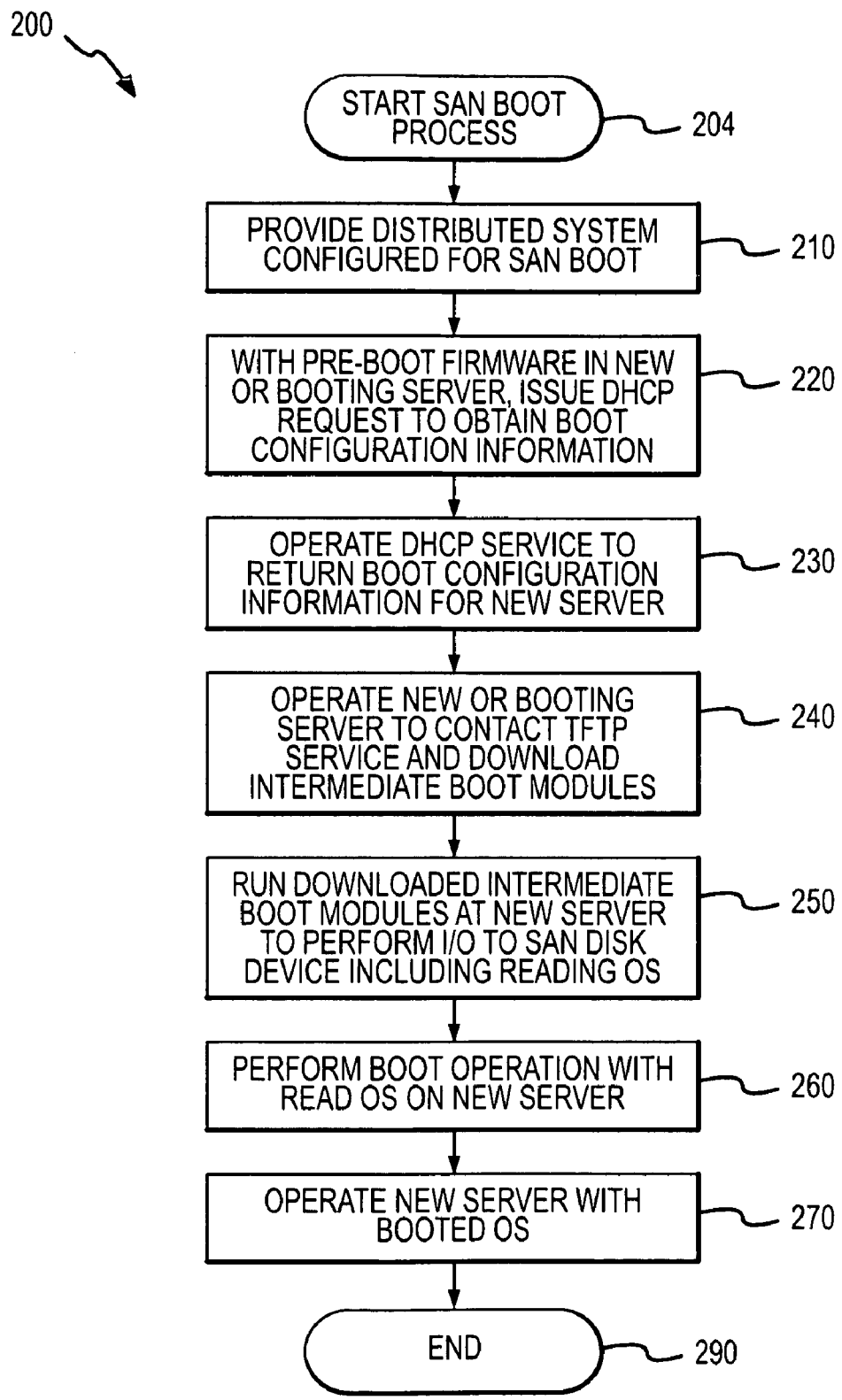
FIG. 2 illustrates exemplary steps performed during a network boot process embodiment of the present invention, such as may be performed during operation of the network components of FIG. 1.

FIG. 2 illustrates a SAN boot method 200 according to one embodiment of the invention and is useful for explaining operation of the network system 100 shown in FIG. 1. As shown, the method 200 starts at 204 such as by selecting one or more operating systems to be provided on disks in a storage network for network booting. For example, it is often desirable to install the same OS to multiple systems in a distributed network environment. At 210, a distributed system, such as network system 100, configured for SAN boot. As discussed above, there are a number of preconditions that preferably are satisfied to facilitate the SAN boot 200. These include linking a DHCP service 110 and a TFTP service 120 to the network 104 to which the new system 150 is also linked, and also, providing configuration information elements 116 and intermediate boot modules 128. Further, step 210 involves copying the OS image 134 to disk device 130 on a SAN or other storage network 108 to which the new system 150 is also linked. Step 210 also includes assuring the new system 156 is adapted with network boot capability 158 in its pre-boot environment 156 and network boot mechanism 158 is configured to find the DHCP service 110 over network 104.

The method 200 continues at 220 with the pre-boot firmware 156 in the new system or server 150 issuing over the network 104 a request, e.g., a DHCP request, to obtain the boot configuration information 116. The request from the pre-boot firmware 156 includes a hardware address for the system 150, and more specifically, network card information (such as a Medium Access Control (MAC) address for the card). At 230, the DHCP service 110 operates to return boot configuration information for the new server 150 that is stored at 162 in memory 160. In step 230, the service 110 typically uses the network card information or ID (such as the MAC address or name) to look up boot configuration information that may is unique to the new system 150, e.g., linked to the MAC address for the server 150.

The boot configuration information 162 may include a range of information but generally includes information useful for performing a storage network boot including addressing the disk device 130 and reading the OS 134. To this end, the boot configuration information 162 may include an IP address for the new system 150 but more importantly, include a location of the disk device 130 and an address for a service serving the intermediate boot modules 128. In one embodiment, the location of the disk service 130 is a disk address for the disk device 130 on the SAN 108, such as an iSCSI disk address or Fibre Channel address. The address for the boot modules 128 typically will be the TFTP service address 120 on network 104.

At 240, the new or booting system (or server) 150 processes the retrieved configuration information 162 and then, to contact the TFTP service 120 to request one or more of the intermediate boot modules 128. The modules 128 are then downloaded as element 164 in memory 160 to the new system 150. At 250, the intermediate boot modules 170 are run to perform input and output operations (I/O) to the disk device. These operations include the modules 170 reading the OS image 134 from disk device 130 and storing the OS 166 in new system memory 160. The intermediate boot modules 170 are able to perform this reading by using the retrieved configuration information 162 including a disk location for disk device 130, e.g., the disk address and/or path on the SAN 108 for the disk device 130, obtained from the DHCP service in steps 220 and 230. As can be seen, an administrator does not have to select the disk device 130 from all such devices on the SAN 108, which would be a difficult task, and does not need to manually enter an address or path for the disk device 130.

Once the OS 166 is read or installed on the new system 150, the new system 150 can boot at 260 using the read OS 166. At 270, the new server or system 150 operates using the booted OS 180 from the SAN disk device 130. The method 200 then ends at 290, and typically, the boot operation 200 is repeated for each new server, system, or computing device that is added to the network system 100 and that is to run the OS 134. In other embodiments not shown, more than one OS 134 may be provided on one or more disk devices on the SAN 108 (or on multiple storage networks). The OS 134 is specified in the method 200 by the providing of the disk location in the boot configuration information 116 in the DHCP service 110 (and in part, by the configuration of the intermediate boot modules 128 that provide I/O functionality for the booting system 150).

In some embodiments of the invention, it is useful to provide components that allow a system or network administrator to readily configure a system for SAN boot by meeting the preconditions that allow a new system to perform the SAN boot. In this regard, FIG. 3 illustrates a network system 300 that is configured for performing an initiation or install process (as explained with reference to FIG. 4) to place a system, such as network system 100 of FIG. 1, in condition for performing a SAN boot. The network system 300 includes many of the components of the network system 100 and their description is not repeated here. Additionally, the network system 300 includes an install service 310 that is communicatively linked with the communications network 104 and to the storage network 108. The install service 310 may be provided on one or more network devices such as a typical server. The install service 310 is shown to include a user interface 312 to allow a user or administrator to view and input data. A processor 314 is provided for running applications, managing operation of the service 310, and for managing memory 330.

Figure 4:
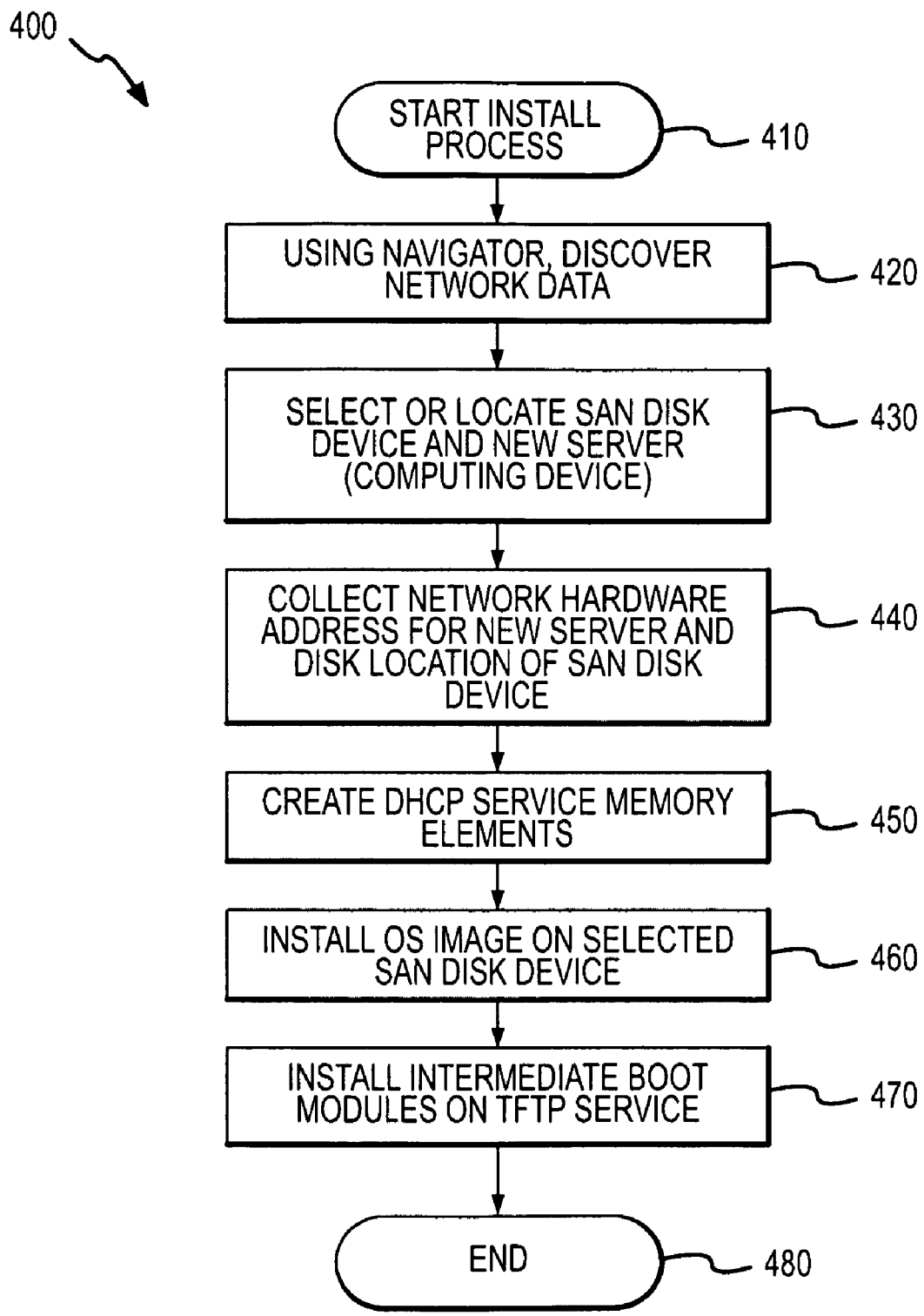
FIG. 4 is a flow diagram of a method of installing an OS, such as may be performed during operation of the system of FIG. 3.

The server 310 includes an install mechanism 320 for performing and managing the initiation or installation process, as shown in FIG. 4. A network navigation mechanism (e.g., a SAN navigator application) is also provided in the service 310 for discovering the topology of the SAN 108 and its devices 130 and for displaying topology information to the administrator, such as via the interface 312 which may include a monitor and typical input devices such as a keyboard, mouse, and the like. Memory 330 is provided for storing intermediate boot modules 332 that can be made available over the network 104 to new systems 150, such as by storing on a TFTP or other server 120. One or more OS image 334 are also stored in memory 330 for later delivery to select disk devices in the storage network 108. Additionally, during operation discovered network data 338 collected by the network navigation mechanism 326 may be stored in memory 330 for use by an administrator in selecting a device for holding the OS image 334 and for generating and providing boot configuration information to a new system 150 such as via DHCP service 110.

FIG. 4 provides one exemplary install or initiation process 400 that may be performed by operating the install service 310 shown in FIG. 3. The process 400 begins at 410 such as by loading the install mechanism 320 and network navigation mechanism 326 on the service 310 and by storing the boot modules 332 and OS image(s) 334 in memory 330. At 420, the process 400 continues with using the navigator 326 to discover network data 338 for the storage network 108 and for servers or systems 150 on the communications network 104. This discovery includes determining the location of disk devices 130 and network information for the new server 150, such as its network card ID or MAC address. At 430, the install mechanism 320 allows the administrator to select the disk device 130 and to identify the new server(s) 150 for use in the SAN boot method. At 440, the network hardware address for the new system 150 and the disk location for the SAN disk device 130 are collected, and at 450, the install mechanism 310 functions to create the DHCP service memory elements 116 that are stored in the memory 112 of the DHCP service 110. For example, an element 116 is created for each new system 150 (i.e., system in network system 300 that can perform SAN boots) that includes at least the network hardware (e.g., MAC address) for the system 150 and boot configuration information for that system 150 including its IP address, the location (e.g., address and/or path) for the SAN disk device 130, and address of the device holding the intermediate boot modules 128 (i.e., the TFTP service 120).

At 460, the method 400 continues with the install mechanism 320 acting to install the OS image 334 onto the selected SAN disk device 130 as OS image 134. At 470, the initiation process 400 continues with installing the intermediate boot modules 128 on the TFTP service 120 with the install mechanism 320 by copying the modules 332 from memory 330 over network 104. At 480, the method 400 ends 480. As will be appreciated, the method 400 may be repeated periodically to add differing OS images 334 and/or boot modules to the network system 300 and/or to account for modifications of the SAN 108 or addition/deletion of the booting systems 150. As discussed above, the method 400 may also be used to configure a system 400 that enables systems 150 to boot with the same or differing operating systems simply by installing differing OS images on disk devices 130. The method 400 (as with method 200) is applicable to a variety of storage network or other networks with disk devices 130 such as iSCSI storage networks, Fibre Channel-based storage networks, and others.

From the above description, the storage network or SAN boot method of the invention can be described abstractly as utilizing some techniques used to boot diskless clients but yet adding unique features to achieve desirable results in external, networked disk boot environment. In this regard, for either local disk or disk client booting, the boot process starts with limited capability pre-boot software (such as OBP for SPARC or BIOS for X86 systems). This pre-boot software runs long enough to locate and begin executing a more capable OS. After the OS is installed to disk, the pre-boot phase uses a saved copy of the boot disk path and starts doing disk I/O to the boot disk, and it also starts executing the installed OS. In contrast, diskless client involves the pre-boot software or environment locating a network file system (such as an NFS share) containing the full OS, and then accessing this OS as a remote network file system. In addition to using file I/O rather than disk I/O as used by local disk installation, the diskless client boot process relies on information stored on a central server (e.g., a NFS server) that is shared via network protocols (such as BOOTP, DHCP, or PXE) and uses TFTP to download and then execute more capable software.

The SAN boot method may utilize network protocols, such as BOOTP, DHCP, and/or PXE to share information from central servers (such as a blade computer service processor or the like shown as install service 310 in FIG. 3). The SAN boot method also may use TFTP to load more capable I/O software (i.e., the intermediate boot modules 128 onto the booting server 150). A significant difference between the SAN boot method and prior boot methods (including diskless client boots) is that the pre-boot software phase culminates with disk I/O to a storage network disk 130 performed by the boot modules 170 running on the booting system 150 rather than a file system I/O operation. Hence, part of the invention can be considered the use of TFTP service 120 to load additional intelligence or software (i.e., the retrieved modules 164) onto the booting server 150 that enables iSCSI, Fibre Channel, or other storage network I/O rather than incorporating boot support into the pre-boot software (e.g., into OBP, BIOS, or the like). Another unique feature is the use of DHCP service 110 to specify Fibre Channel, iSCSI, or other storage network 108 boot paths to disk 130 (i.e., specifying disk boot paths with service 110) via the use of the boot configuration information elements 116 that are linked to the MAC address or other network identifier for each new or booting server 150.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

I claim:

1. A computer-based method for performing a boot from a storage network, comprising:
    providing on a communications network a first server storing sets of boot configuration information each linked to a network device identifier;
    providing on the communications network a second server storing an intermediate boot module;
    at the first server, receiving a request from a network device linked to the communications network and to a storage network, wherein the request comprises a hardware identifier for the network device;
    with the first server, returning to the network device one of the sets of boot configuration information having the network device identifier matching the hardware identifier in the request;
    processing the returned set of boot configuration information with the network device to determine an address for the second server;
    using the address for the second server to contact the second server and download the intermediate boot module on the network device; and
    running the intermediate boot module on the network device to read an image of an operating system on a disk device in the storage network using storage network transport mechanisms.

2. The method of claim 1, wherein the boot configuration information comprises a location of the disk device on the storage network.

3. The method of claim 2, further comprising discovering the disk device in the storage network and storing the operating system image on the disk device prior to the providing of the sets of boot configuration information on the first server.

4. The method of claim 1, wherein the hardware identifier comprises an address of a network adapter for the network device.

5. The method of claim 4, wherein the address is a Medium Access Control (MAC) address for the network adapter.

6. The method of claim 1, wherein the first server is configured as a Dynamic Host Configuration Protocol (DHCP) server and wherein the request is a DHCP request transmitted on the communications network.

7. The method of claim 1, wherein the intermediate boot module is configured to perform input/output (I/O) functions based on transport protocols of the storage network.

8. The method of claim 1, further comprising performing a boot operation at the network device with the read operating system image.

9. A storage network boot system comprising:
    a configuration information service linked to a communications network storing boot configuration information linked to a plurality of network card identifiers; and
    a booting computer system linked to the communications network and to a storage network, wherein the booting computer system comprises a network boot mechanism transmitting a request over the communications network to the configuration information service including a hardware address for the booting computer system, wherein the configuration information service responds to the request by returning the boot configuration information linked to one of the network card identifiers matching the hardware address in the request to the booting computer system, and wherein the returned boot configuration information includes a location in the storage network for a disk device containing an operating system image.

10. The system of claim 9, further comprising the storage network with a plurality of disk devices including the disk device containing the operating system image.

11. The system of claim 9, further comprising a boot support service linked to the communications network, the boot support service storing intermediate boot modules configured to provide I/O functionality in the storage network and wherein the returned boot configuration comprises a network address for the boot support service and wherein the booting computer system processes the returned boot configuration information and contacts the boot support service using the network address to download and run the intermediate boot modules.

12. The system of claim 11, wherein the intermediate boot modules use the location of the disk device to read the operating system image over the storage network and to store the read operating system image on the booting computer system.

13. The system of claim 12, wherein the I/O functionality of the intermediate boot modules comprise transport mechanisms complying with transport protocols of the storage network.

14. The system of claim 9, wherein the configuration information service is configured as a Dynamic Host Configuration Protocol (DHCP) server and wherein the request is a DHCP request transmitted on the communications network.

15. A storage area network boot method comprising:
    discovering an available disk device on a storage area network and a network identifier for a server on a communications network;
    storing an image of an operating system on the disk device;
    in a boot configuration information service linked to the communications network, storing boot configuration information for the server retrievable based on the network identifier for the server, the boot configuration information comprising a location of the disk device in the storage area network obtained in the discovering;
    with the boot configuration information service, responding to a request on the communications network from the server by transmitting to the server the boot configuration information for the server, the responding including comparing a hardware identifier in the request to the discovered network identifier to identify the boot configuration information for the server; and
    operating the server to read the image of the operating system using the location of the disk device.

16. The method of claim 15, wherein the boot configuration information for the server further comprises an address for a boot support service on the communications network, the method further comprising operating the server to obtain a set of intermediate boot modules from the boot support service and to run the intermediate boot modules to read the image of the operating system and load the image of the operating system on the server.

17. The method of claim 16, wherein the intermediate boot modules perform I/O over the storage area network according to transport protocols of the storage area network.

18. The method of claim 15, wherein the hardware identifier is a MAC address of a network adapter of the server.

19. The method of claim 15, further comprising performing a boot of the server with the read image of the operating system.

20. The method of claim 15, wherein the location of the disk device comprises an address and path to the disk device in the storage area network.

* * * * *